Jan. 10, 1939.  J. V. MORRISSEY  2,143,818
EXPANSION JOINT COUPLING
Filed Jan. 21, 1937

Inventor:
JOSEPH V. MORRISSEY,
by: Usina & Lauber
his Attorneys

Patented Jan. 10, 1939

2,143,818

UNITED STATES PATENT OFFICE 2,143,818

EXPANSION JOINT COUPLING

Joseph V. Morrissey, Waukegan, Ill., assignor to Cyclone Fence Company, a corporation of New Jersey Application January 21, 1937, Serial No. 121,649

1 Claim. (Cl. 287—108)

This invention relates to expansion joint couplings and especially those which are particularly adapted for use with metal fences, hand railings or the like, although not limited thereto.

An object of this invention is to provide a novel, effective, expansion joint coupling that is easily assembled.

The above and further objects will become apparent by referring to the following description and the accompanying drawing in which.

Figure 1:
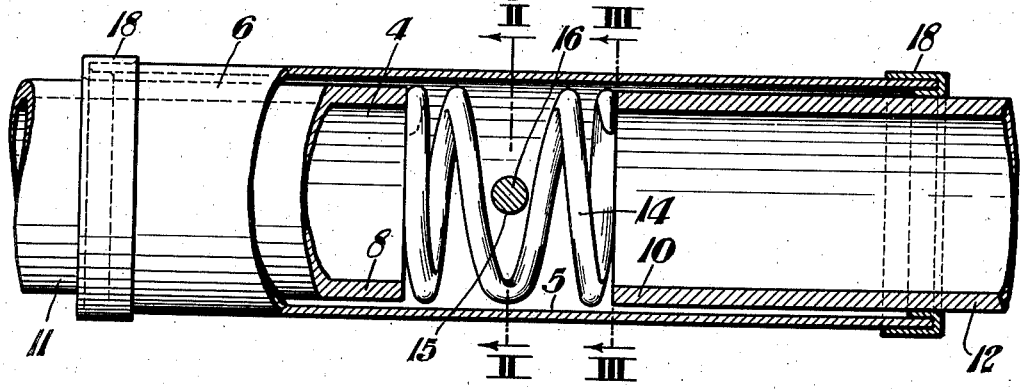
Figure 1 is an elevation, partly in section, of one embodiment of my invention.
Figure 2:
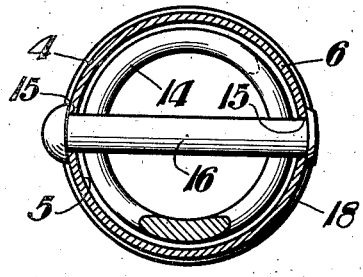
Figure 2 is a section on line II—II of Figure 1.
Figure 3:
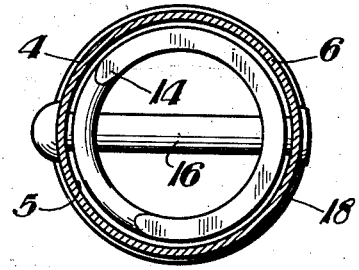
Figure 3 is a section on line III—III of Figure 1.

Referring more particularly to the drawing, the numeral 4 indicates generally the expansion joint coupling which includes a tubular member or sleeve 6. The sleeve 6 is provided with a smooth circular bore 5 and is adapted to receive adjacent ends 8 and 10 of pipes or rods 11 and 12 which form the top rail of a wire fence, hand rail, or the like. The expansion joint coupling 4 is constructed and arranged to retain the adjacent ends 8 and 10, respectively, of the pipes or rods 11 and 12, and compensate for the expansion and contraction thereof. The ends 8 and 10 are normally spaced from each other, and the sleeve 6 is of such length that they would not normally be moved therefrom by expansion and contraction of the pipes 11 and 12.

The pipes or rods 11 and 12 move slightly with changes in temperature and to provide means for controlling; and offering resistance to such movement a spring 14, preferably provided with substantially flat end surfaces, is disposed in the sleeve 6. The spring 14 is adjacent aligned apertures 15 which extends through both walls of the sleeve 6. In order to positively hold the spring 14 in the sleeve 6 and thereby prevent one of the pipes 11 or 12 from pushing the other from the sleeve, a suitable securing device, for example a rivet 16, is placed through the apertures 15 and spring 14. To protect the ends of the sleeve 6, means, such as caps 18, can be forced thereon or otherwise secured thereto.

The sleeve 6, which is the essential part of the coupling 4, is preferably formed from hot-rolled mild steel and is of standard shape. The parts of the coupling 4 can be easily and rapidly assembled, as is evident from Figure 1 of the drawing.

While I have shown and described a specific embodiment of my invention, it will be seen that I do not wish to be limited thereto, since various modifications may be made without departing from the scope of the invention as defined by the following claim.

I claim:

An expansion joint coupling comprising a sleeve having a bore of uniform cross-section, elongated members positioned within and substantially filling the cross-section of the bore of said sleeve for longitudinal expansion and contraction therein, a unitary compression spring co-axially disposed within said sleeve between the ends of said members to maintain said members in spaced relation, aligned openings through the walls of said sleeve and a pin extending transversely through said sleeve and between the coils of said spring to retain said spring against substantial movement in either direction axially of said sleeve except by rotation, whereby either of said members is prevented from pushing the other member out of said sleeve.

JOSEPH V. MORRISSEY.